Jan. 21, 1936.  E. W. JOHNSON  2,028,286
SEISMIC SURVEYING
Filed July 26, 1935
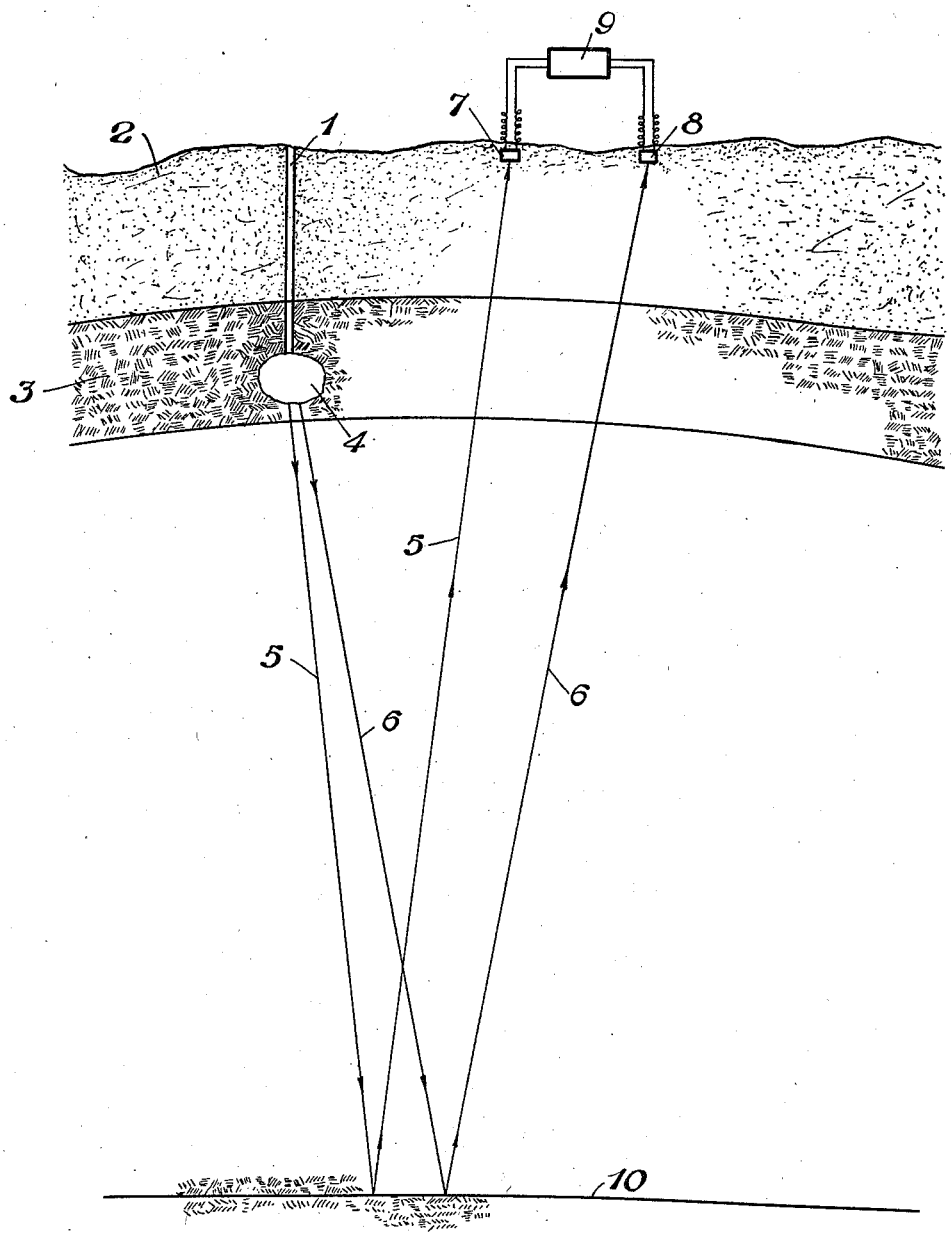
INVENTOR
Earle W. Johnson
BY
ATTORNEY

UNITED STATES PATENT OFFICE 2,028,286

SEISMIC SURVEYING

Earle W. Johnson, Dallas, Tex., assignor to Western Geophysical Company, Tulsa, Okla., a corporation of Delaware Application July 26, 1935, Serial No. 33,367

20 Claims. (Cl. 181—0.5)

This invention relates to the determination of subsurface geological structures by means of seismic vibrations or, in other words, to seismic surveying.

It is an object of my invention to provide a means whereby an increased amount of useful energy in the form of seismic vibrations can be made available for seismic surveying purposes. Other and more detailed objects of my invention will become apparent as the description thereof proceeds.

The determination of subsurface geological structures by means of seismic vibrations has attained commercial importance particularly in the location of structures likely to form reservoirs for the accumulation of petroleum. The methods used are of two general types, first the so-called refraction methods in which the depths of various strata are determined by discontinuities in traveling time curves and second the so-called reflection methods in which the seismic waves are reflected from an underground stratum or interface and the depth and/or slope of the reflecting structure is determined. These methods are in general well known to those skilled in the art and do not need detailed description.

In either type of method the usual procedure is to generate seismic waves by detonating an explosive charge, usually in a shallow well, and to record the refracted or reflected waves received at a plurality of points at or near the surface of the ground by suitable detecting and recording instruments of various types known to the art.

Only a very small proportion of the total energy generated by such an explosion traverses the desired path and is received by the detecting instruments. It is therefore highly important to introduce as much energy as possible by means of the explosion. For this reason many operators have utilized very large charges of explosives but have still been unable to put a sufficient amount of transmissible energy into the ground.

I believe that this may be accounted for by a theory which has heretofore been entirely unappreciated.

It has been found desirable in seismic surveying operations to place the explosive charge at a considerable distance underground, for instance, from 2 to 400 feet and in many cases it has been thought desirable or found necessary to place the charge in a hard geological formation, such as hard limestone, sandstone or hard shale. Thus, for instance, it is often found that such soft formations as sand saturated with water, soft shale, clay, etc. are not present at depths which can be reached economically with the drill.

The energy in the seismic waves is transmitted through the earth by compression of the material nearest the explosion, which in turn transmits this force to the more distant portions of the formation. The molecules of the material are moved from their rest positions during this compression. The maximum energy which may be transmitted through a unit area of the material is that which stresses the molecules up to the elastic limit of the substance and is thus a function of the elastic properties of the material. If the explosive force per unit area is greater than this stress, part of the remaining energy is consumed in shattering the material or in compressing it beyond its elastic limit, and the rest is lost up the hole. If a charge is exploded in a comparatively soft material, the hole will be enlarged until the total surface of application of the force is such that the stress on the material is just sufficient to strain it to its elastic limit. Thus the maximum energy than can be transmitted is directly proportional to the area which is stressed to the elastic limit and cannot be increased by adding to the total explosive force unless this addition results in an increased area of application. This area is the area of the hole at the point of explosion at the limit of shattering. Thus, in soft formations, there is an automatic adjustment of the cavity area to the energy released by the explosion. If the formation is hard, appreciable shattering or compression beyond the elastic limit will not occur, and most of the released energy which does not stress the sides of the drilled hole to the elastic limit will be wasted up the drill hole, in the same manner as a shot out of a gun. Therefore, more energy is transmitted to the deeper formation by a heavy charge of explosive in a soft formation than in one which is comparatively hard. In a hard formation, the explosion of a charge larger than that necessary to stress the sides of the drill hole to the elastic limit does not increase the energy transmitted to the formation as seismic waves.

It is an object of my invention to remedy this defect and provide means to increase the energy transmitted through the material by the explosion.

Thus, I have found that when placing the explosive in a hard formation such as hard limestone, hard shale, sandstone or other rock in which the explosion does not produce any substantial increase in the size of the cavity there will be found a limit to the amount of charge that can be used effectively and a small charge will accomplish practically the same results as a much larger charge. There are many cases where this limit is so low that the maximum amount of transmissible energy which can be imparted to the earth is insufficient for practical use in surveys.

This defect may be remedied by increasing the area of the rock formation to which the original explosive force is applied in the first instance. Thus, instead of using the conventional practice of drilling a small hole, which may typically have a diameter of about four inches, and then placing the charge of explosive at the bottom of this hole, my present invention contemplates the formation of a much larger cavity at the bottom of the drill hole, and then placing the explosive charge in this enlarged cavity. While the small amount of energy which can be transmitted through any unit area transverse to the direction of the seismic wave is limited by the elastic properties of the formation as previously described, I apply this limiting unit amount of energy to a much greater area than has heretofore been used and the total amount of seismic energy transmitted to the deeper formations is thus multiplied in proportion to the ratio between the surface of my enlarged cavity and the surface of the bottom portion of the conventional small drill holes.

The surface area of my cavity and the charge of explosive must be proportioned to each other in order to produce seismic waves of sufficient energy to actuate the instruments used for detecting the waves. The cavity must be large enough so that there will be sufficient surface area stressed to the elastic limit to produce the desired energy in the seismic waves. The optimum charge is that which is just sufficient to stress the material at the surface of the cavity to its elastic limit. The amount of charge to be used to give this result will depend upon a large number of factors and must be determined by experiment as will be readily appreciated by those skilled in this art. The size of the required cavity and the charge to be used must therefore be determined for the formation under consideration.

In general I may use a cavity having a surface area at least equal to that of a sphere one foot in diameter and preferably at least equal to that of a sphere three feet in diameter.

The enlarged cavity at the bottom of the conventional drill hole may be made in various ways. Thus, it can be made by under-reaming the drill hole by the use of equipment which is conventional for other purposes in the oil industry. However, these under-reamers are not able to produce cavities as large as those which are sometimes desirable.

I prefer to make my enlarged cavities by the use of acids or other solvents which will dissolve and remove a portion of the formation at the base of the drill hole. Thus, when dealing with a hard limestone, hydrochloric acid, nitric acid or other strong mineral acid, can be used to dissolve out a portion of the limestone and leave the desired cavity. Sulfuric acid is not desirable since it reacts with the limestone to form insoluble calcium sulfate. Similarly, in the case of a sandstone, hydrofluoric acid can be used.

When operating in this manner drillers may be sent ahead of the main seismograph party to prepare the drill holes and apply the acid in order to give it time to react on the formation. In many cases it is desirable to add the acid a number of times in order to secure the desired cavity.

In some cases where the structure in which the acid is to be placed is wholly or partially porous or fissured it is difficult to keep the acid in contact with the formation sufficiently long to secure the desired results. In such cases a material, such as asphalt or paraffin wax, may be applied to the formation through the drill hole in a heated condition and blown back into the formation by air pressure or otherwise in order to form a limiting boundary beyond which the acid cannot penetrate, thereby keeping it in contact with the desired portion of the formation.

It may be argued that a hole of sufficient size could be drilled from the surface so that the development of a sub-surface cavity would be unnecessary. This method has two disadvantages. First, the drilling of a hole of such size would undoubtedly be uneconomical if not impractical. Second, there is much less loss of energy up the bore if a small hole is used, since the constriction of the top part of the cavity confines the explosive force more effectively than in the case of a straight sided drill hole. In other words, the charge is practically enclosed in a cavity in the formation, while if a large hole is drilled from the surface there is nothing but the tamping fluid or material to cap the charge and absorb the energy directed upward during the explosion. Thus this large part of the explosive energy is lost.

I therefore prefer that the enlarged cavity at the base of my drill hole have a diameter at least three times that of the drill hole.

It may also be argued that the same amount of energy in the form of seismic waves could be produced in a hard formation by the detonation of a large charge of explosive in a small hole, the explosive being so distributed along the hole from the base upward so that upon detonation the walls of the small hole are stressed to the elastic limit for a length sufficient to produce the desired seismic energy. This method has a serious disadvantage in addition to that above mentioned. The waves resulting from such an explosion do not emanate from a common source, and after reflection from an underlying geological structure produce seismic records difficult of interpretation. When the waves come from a cavity at the base of the hole, they are propagated approximately as from a point source and the records of the reflected waves may be interpreted with much greater ease.

After the desired cavity is formed the explosive is lowered into it and suitable tamping may be added. This tamping is usually water, which may in some cases already be present in the cavity and drill hole. The explosive is then detonated and the resulting refracted or reflected seismic vibrations are received and recorded in one of the conventional manners.

One method of operating in accordance with my invention is shown in the attached drawing which is a conventionalized diagram and forms a portion of this specification.

Referring more specifically to the drawing, the customary drill hole 1 is drilled from the surface of the ground 2 into a hard rock formation 3 and an enlarged cavity 4 is formed at the bottom of the drill hole. The explosive is detonated in the cavity 4 and seismic waves are propagated from it in all directions. One such wave follows the path 5, is reflected from a deep formation or interface 10 (usually much deeper than shown in the drawing) and is received by a suitable detecting instrument 7. A second such wave follows the path 6 and is received by detecting instrument 8. In common practice a large number of these instruments will be used and will be connected to a common recorder 9, but the exact system of detecting and recording the seismic vibrations and interpreting the records in order to obtain data concerning the underground structure 10 may suitably be in accordance with present prior art methods and does not form a portion of the present invention.

While I have described my invention in connection with certain specific embodiments and in connection with certain theories to account for its operation, these specific embodiments and these theories are by way of illustration rather than by way of limitation and I do not mean to be restricted thereby but only to the broadest valid scope of the appended claims in which I have defined the novel features of my invention.

I claim:

1. A method of determining an underground geological structure comprising drilling a small hole from the surface of the ground into a formation, forming an enlarged cavity in said formation at the base of said hole, thereafter detonating an explosive charge within said cavity and receiving and recording the resulting seismic waves after said waves have penetrated to said structure.

2. A method according to claim 1 in which said enlarged cavity has a diameter at least about three times the diameter of said small hole.

3. A method according to claim 1 in which said cavity has a surface area at least equal to that of a sphere one foot in diameter.

4. A method according to claim 1 in which said cavity has a surface area at least equal to that of a sphere three feet in diameter.

5. A method of determining an underground geological structure comprising drilling a small hole from the surface of the ground into an underlying hard formation, forming an enlarged cavity in said formation at the base of said hole, detonating an explosive charge within said cavity, the size of said cavity being such that there is sufficient area of cavity wall stressed to the point of maximum energy transfer into said formation to produce seismic waves of requisite energy, and receiving and recording said waves after they have penetrated to said structure.

6. A method of determining an underground geological structure comprising drilling a small hole from the surface of the ground into an underlying hard formation, forming an enlarged cavity in said formation at the base of said hole, detonating an explosive charge within said cavity, said charge being substantially the maximum charge which can be exploded in said cavity without exceeding that required to produce the maximum transmissible energy, and receiving and recording the resulting seismic waves after said waves have penetrated to said structure.

7. A method of determining an underground geological structure comprising drilling a small hole from the surface of the ground into an underlying hard formation, forming an enlarged cavity in said formation at the base of said hole by mechanical means, detonating an explosive charge within said cavity, and receiving and recording the resultant seismic waves after said waves have penetrated to said structure.

8. A method according to claim 7 in which said cavity has a diameter at least about three times the diameter of said small hole.

9. A method according to claim 7 in which said cavity is formed by under-reaming said small hole.

10. A method of determining an underground geological structure comprising drilling a small hole from the surface of the ground into an underlying hard formation, forming an enlarged cavity in said formation at the base of said hole by the use of a solvent for said formation, detonating an explosive charge within said cavity and receiving and recording the resulting seismic waves after said waves have penetrated to said structure.

11. A method according to claim 10 in which said cavity has a diameter at least about three times the diameter of said small hole.

12. A method of determining an underground geological structure comprising drilling a small hole from the surface of the ground into an underlying hard limestone formation, introducing a mineral acid into said hole to dissolve out an enlarged cavity in said formation at the base of said hole, detonating an explosive charge within said cavity and receiving and recording the resulting seismic waves after said waves have penetrated to said structure.

13. A method of determining an underground geological structure comprising drilling a small hole from the surface of the ground into an underlying hard formation which is at least partially porous or fissured, applying some material to the formation at the base of said hole to limit seepage beyond the bounds of said hole long enough to allow a solvent to act on said formation, forming an enlarged cavity in said formation at the base of said hole by the use of a solvent for said formation, detonating an explosive charge within said cavity, and receiving and recording the resulting seismic waves after said waves have penetrated to said structure.

14. A method of determining an underground geological structure comprising drilling a small hole from the surface of the ground into an underlying hard limestone formation, introducing hydrochloric acid into said hole to dissolve out an enlarged cavity in said formation at the base of said hole, detonating an explosive charge within said cavity and receiving and recording the resulting seismic waves after said waves have penetrated to said structure.

15. A method of determining an underground geological structure comprising drilling a small hole from the surface of the ground into an underlying hard limestone formation, introducing nitric acid into said hole to dissolve out an enlarged cavity in said formation at the base of said hole, detonating an explosive charge within said cavity and receiving and recording the resulting seismic waves after said waves have penetrated to said structure.

16. A method of determining an underground geological structure comprising drilling a small hole from the surface of the ground into an underlying hard sandstone formation, introducing hydrofluoric acid into said hole to dissolve out an enlarged cavity in said formation at the base of said hole, detonating an explosive charge within said cavity and receiving and recording the resulting seismic waves after said waves have penetrated to said structure.

17. A method of determining an underground geological structure comprising drilling a small hole from the surface of the ground into an underlying hard formation, said underlying hard formation being of a type in which the detonation of explosive charges such as are used in seismic surveying does not result in any substantial increase in the size of the cavity in which said explosive charges are detonated, forming an enlarged cavity in said formation at the base of said hole, detonating an explosive charge within said cavity, and receiving and recording the resulting seismic waves after said waves have penetrated to said structure.

18. A method according to claim 13 in which said cavity has a surface area at least equal to that of a sphere one foot in diameter.

19. A method according to claim 13 in which said cavity has a surface area at least equal to that of a sphere three feet in diameter.

20. A method of determining an underground geological structure comprising drilling a small hole from the surface of the ground into an underlying hard formation, said underlying hard formation being of a type in which the detonation of explosive charges such as are used in seismic surveying does not result in any substantial increase in the size of the cavity in which said explosive charges are detonated, forming an enlarged cavity in said formation at the base of said hole, detonating an explosive charge within said cavity, said charge being substantially that which is just sufficient to stress the material adjacent said cavity to its elastic limit, and receiving and recording the resulting seismic waves after said waves have penetrated to said structure.

EARLE W. JOHNSON.